J. W. BRYCE

SCALE

Filed March 13, 1923

Inventor
James W. Bryce
By Cooper, Kerr & Dunham
his Attorneys

May 10, 1927.  J. W. BRYCE  1,628,110
SCALE
Filed March 13, 1923    6 Sheets-Sheet 3

Inventor
James W Bryce
By Cooper, Kerr & Dunham
his Attorneys

May 10, 1927.

J. W. BRYCE 1,628,110

SCALE

Filed March 13, 1923

J. W. BRYCE 1,628,110

SCALE

Filed March 13, 1923

Inventor
James W. Bryce

By Cooper, Kerr + Dunham
his Attorneys

Patented May 10, 1927.

1,628,110

UNITED STATES PATENT OFFICE.

JAMES W. BRYCE, OF BLOOMFIELD, NEW JERSEY, ASSIGNOR TO DAYTON SCALE COMPANY, OF DAYTON, OHIO, A CORPORATION OF NEW JERSEY.

SCALE.

Application filed March 13, 1923. Serial No. 624,708.

This invention relates to improvements in weighing scales and is more particularly directed to an improved load offsetting and indicating mechanism for a weighing scale to the general end that weighing operations may be carried out more expeditiously and that the reading of the applied weight may be directly obtained.

Broadly the present invention is directed to the provision of a scale of the capacity weight type in which the capacity weights are both applied and removed automatically and in which the reading of applied load, whether offset entirely by automatic counterbalancing mechanism or in part by it in connection with applied capacity weights, may be read at a single point as one unitary amount without the necessity of mental addition operations on the part of the operator.

Other and more detailed objects of the invention will be more fully set forth in the accompanying specification and drawings and specifically defined in the appended claims.

Fig. 1ª is a detail fragmentary view of the chart, certain of the graduations being omitted.

The scale to which I have illustrated my invention as applied is of a type well known in the trade as an International No. 602 scale. It is to be understood, however, that the present invention is not to be limited to use in connection with this particular form and type of scale and that this particular scale is used merely for convenience in illustration and description since its general construction and operation are well known in the art.

Figure 1:
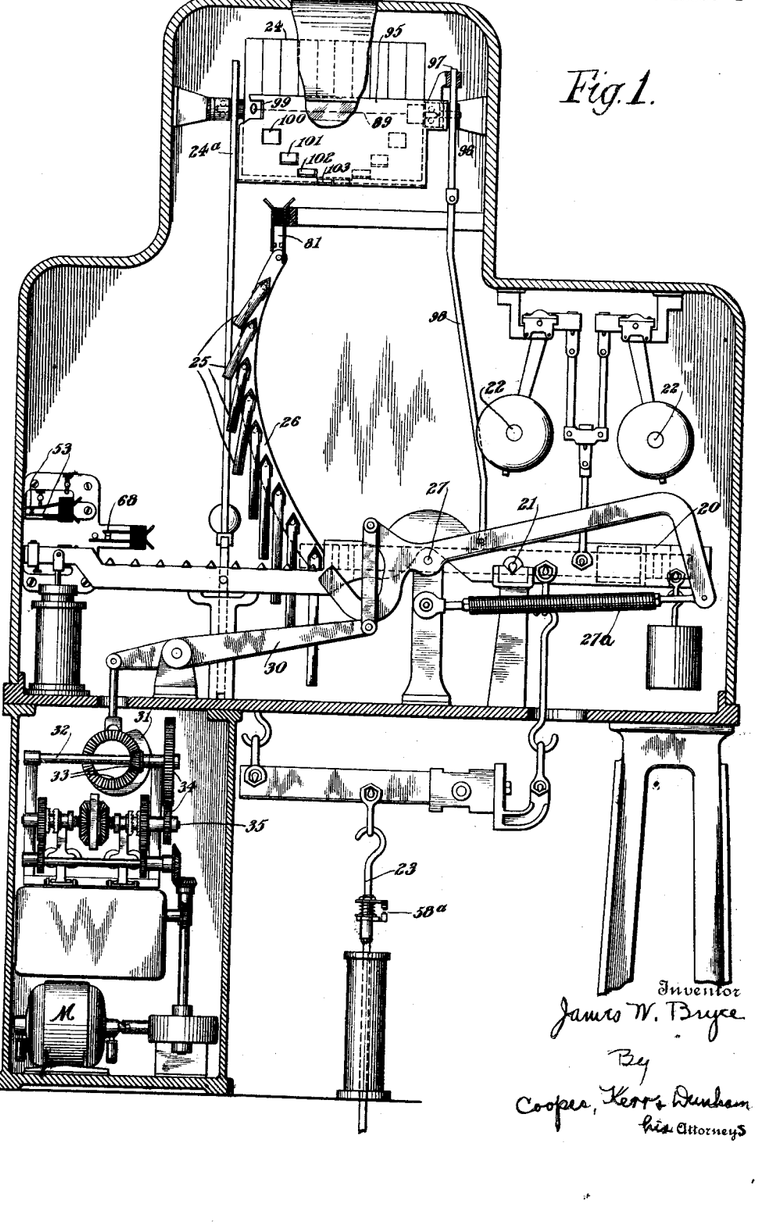
Fig. 1 is an elevational view of the scale with parts of the housing and cover removed. The chart graduations are not shown in this figure.
Figure 1A:
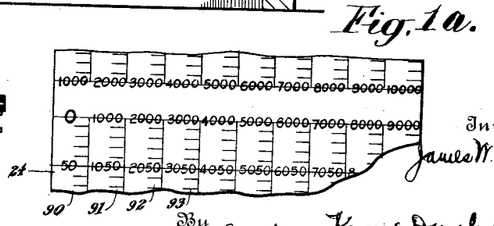

In general, the scale comprises a beam 20 fulcrumed at 21 and having an automatic counterbalancing system such as pendulum 22 connected thereto. A draft rod 23 connects with the usual base lever system and the weight of the load may be transmitted through an intermediate lever and linkage to the beam 20. The indicator which is displaced in accordance with the displacement of the automatic counterbalancing devices comprises a rotatably mounted drum 24 which is suitably operated by a rack rod 24ª from the beam 20. The indicating chart comprises a number of sections 90, 91, 92, 93, etc., as shown in Fig. 1ª. Each section comprises a series of weight graduations arranged in a series and each series is successively arranged with respect to one of its adjacent sections. For example the section at the extreme left would have weight graduations and indications running from 0 to 1000 pounds, the second from 1000 to 2000 pounds, and so on. The casing of the scale is provided with a suitable reading opening and index the latter being shown in dotted lines at 89 in Fig. 1.

When the applied load exceeds the capacity of the automatic counterbalance additional loads may be offset by depositing one or more capacity weights 25 upon the beam. These capacity weights are carried by a weight carrier 26 which is journaled at 27 and counterbalanced by the usual spring 27ª. In place of indicating the amount of load offset by the capacity weights and mentally adding this weight to the amount of the load which is automatically counterbalanced, I provide a shutter device 95 which is pivotally supported concentrically with respect to the rotatable drum chart 24. This shutter is operated in accordance with the position of the weight carrier by a linkage comprising pinion and rack 96 and 97 and link 98 which connects with the weight carrier 26. The shutter is provided with a number of apertures 99, 100, 101, etc., which apertures are successively brought under the reading opening to display successive sections of the chart to view. The section or sections displayed are in accordance with the applied capacity weight or weights or the load offsetting value thereof and if no capacity weights are applied the first section of the chart is displayed to view. Thus I obtain a direct reading of the load irrespective of whether it is automatically counterbalanced or offset in part by capacity weights.

Heretofore it has been the practice to manually apply the capacity weights and to manually remove the same from the beam.

In the present invention I not only automatically apply the capacity weights as needed, when the live load exceeds the capacity of the automatic counterbalance plus the amount of load offset by any capacity weights already upon the beam, but I also automatically remove the weights as required.

The capacity weights are either automatically applied or removed as needed and the weight changes are effected without carrying the weight carrier through any predetermined cycle such as one, for example, in which the complete set of weights must be applied or removed prior to the selection and removal or application of a single weight.

Figure 2:
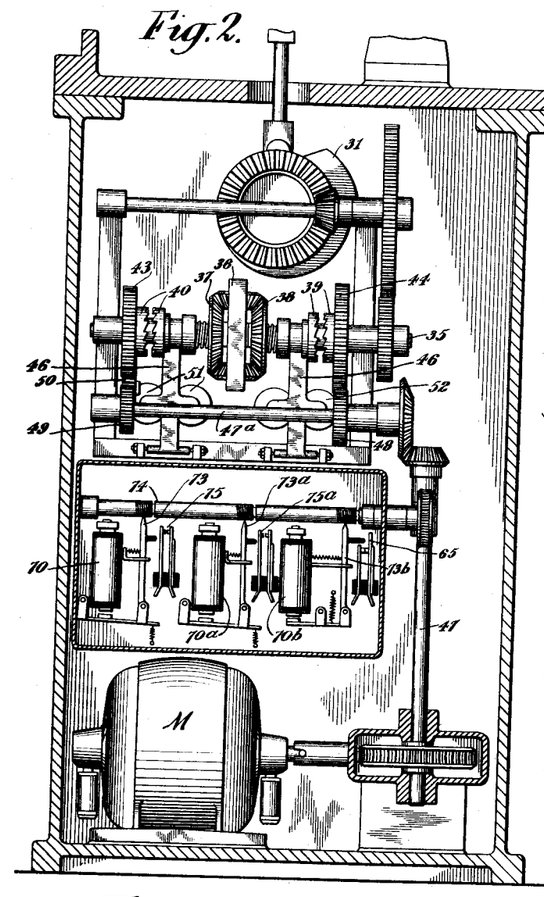
Fig. 2 is an enlarged detail of the clutches and driving connections to the weight carrier cam.
Figure 3:
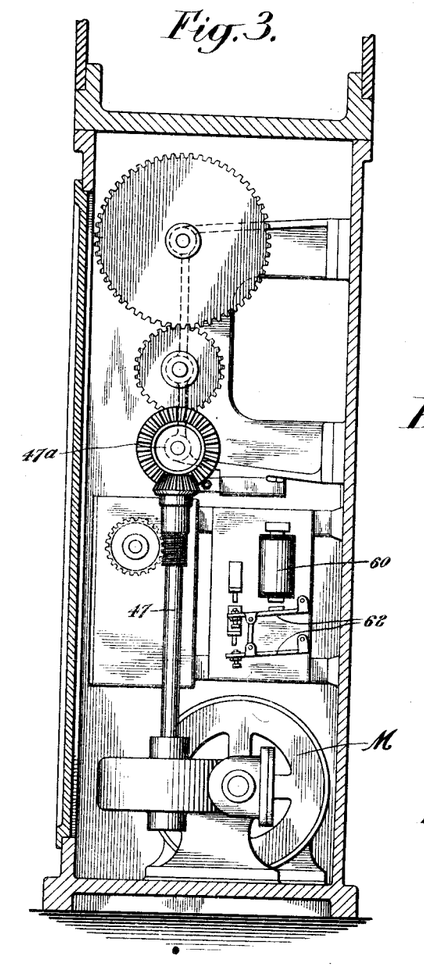
Fig. 3 is a side view of the parts shown in Fig. 2.
Figure 14:
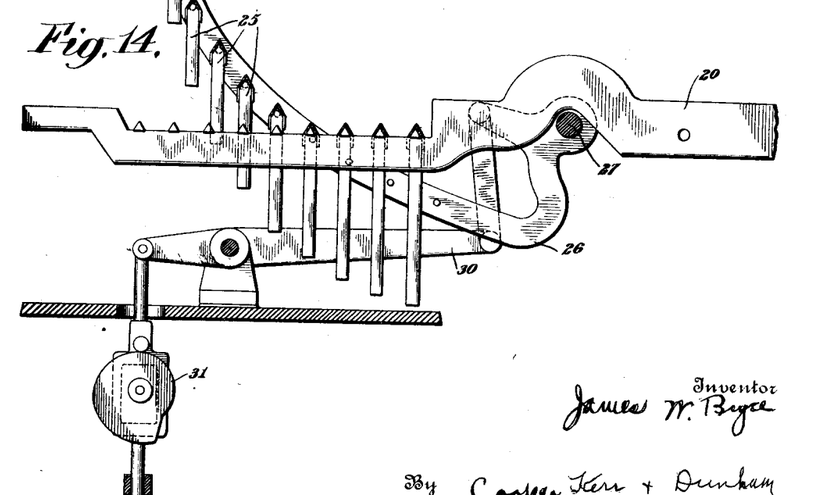
Fig. 14 is an enlarged detail view of the weight carrier and associated scale beam.

In order to actuate the weight carrier I connect it with a rock lever 30 which through a suitable cam follower is variably displaced by a controller in the form of a cam 31 upon shaft 32 (see Figs. 1, 2 and 14). The cam is arranged to be variably displaced so as to cause the weight carrier to apply one or more weights to the beam and upon reversing the direction of motion of the cam the weights are automatically removed by means of spring 27ª. A power drive to the cam is secured through bevel gearing 33 and spur gears 34 from a shaft 35. Shaft 35 is arranged to be selectively clutched to a power motor so that the weight carrier cam will be either rotated forwardly or rearwardly depending upon whether weights are to be applied or removed.

Figure 7:
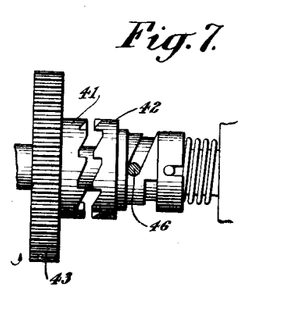
Fig. 7 is a detail view of one of the magnetically controlled clutches.
Figure 10:
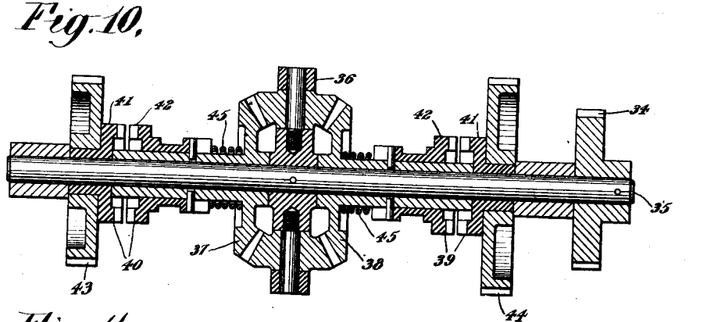
Fig. 10 is a detail sectional view of the driving gearing for the weighing changing device.
Figure 11:
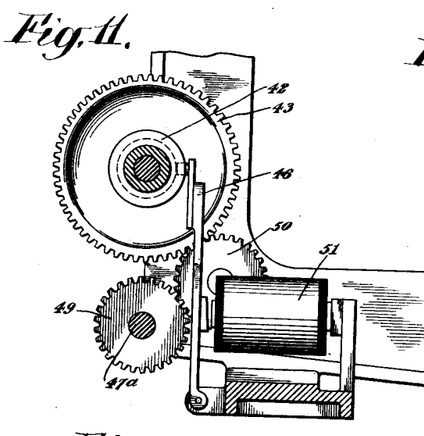
Fig. 11 is an end view of these parts and their associated clutch magnet.
Figure 12:
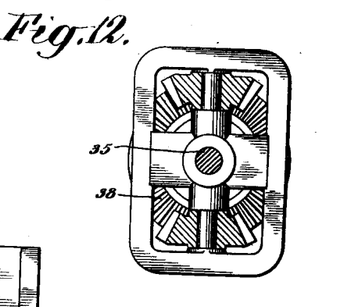
Fig. 12 is a detail view of the differential device used in the gearing shown in section in Fig. 10.

To control this operation and to lock the cam and associated parts in desired position between weight changing operations, I provide the construction which will now be described. Shaft 35 has fastened to it the spider 36 of a differential gearing mechanism including ring gears 37—38. Upon the sleeve-like ends of these gears are clutches 39 and 40. These clutches are best shown in Figs. 7, 10 and 11 and comprise jaw elements 41 and 42, the former attached to gears 43 or 44 (Figs. 2 and 11) and the latter 42 being splined on the sleeve-like ends of gears 37 and 38 and are normally urged into clutching engagement by springs 45. Disengagement of these clutches is secured by magnetically actuated arms 46 which engage in cam grooves in the clutch elements 42 and disengage the jaws thereof. The arms further serve to lock the clutch elements 42 in a predetermined position when the jaws are disengaged (see Fig. 7).

Gears 43 and 44 are driven in opposite directions by means of a motor M. This motor is connected by suitable reducing gearing and shaft 47 to a cross shaft 47ª carrying two pinions 48 and 49. The former meshes directly with gear 44 and the latter meshes with an idler 50 which drives gear 43 (see Fig. 11).

It will be understood that there is an arm 46 for each clutch and that two clutch magnets 51 and 52 are employed. By energizing magnet 52 clutch 39 will be engaged and the cam 31 will be driven forward. If, on the other hand, magnet 51 be energized, the cam 31 will be operated in reverse direction. Capacity weights will be successively applied so long as 52 remains energized and these weights will be successively removed so long as magnet 51 is energized, provided the motor M is rotating. With both magnets deenergized, the weight carrier will remain stationary and be locked by the clutch arms.

Figure 8:
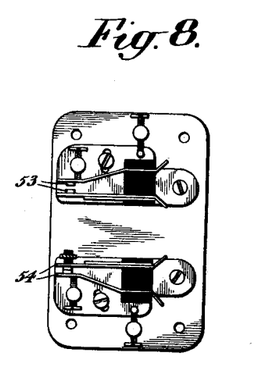
Figs. 8 and 9 are details showing the beam actuated contacts and the bracket for actuating the same from the beam.
Figure 9:
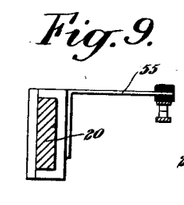

To control the energization of the clutch magnets 51 and 52, I provide controlling contact devices comprising adjustable contacts 53 and 54. These contacts are mounted in proximity to the beam and are actuated by an arm 55 carrying a suitable insulated block thereon, which extends from the scale beam 20 (see Figs. 1, 8 and 9). Suitable provision is made for adjusting these contacts as shown in Fig. 8. The contacts 53 are adapted to be closed when the counterbalance 22 reaches the limit of its travel and 54 are closed by the beam when the beam recedes to its normal no load position. (This position is likewise assumed by the beam when the applied load is overbalanced by the applied capacity weights.)

Figure 15:
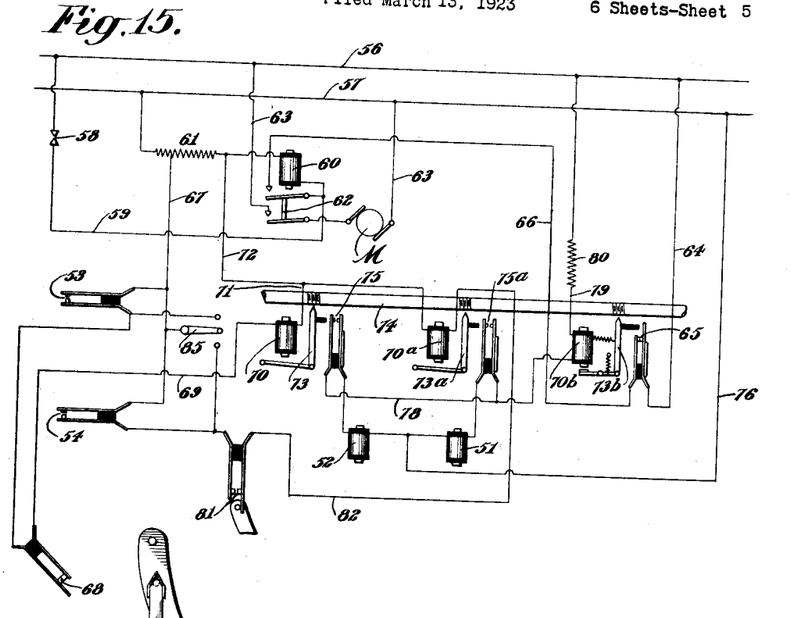
Fig. 15 is a circuit diagram showing the entire set of electrical connections.

The mode of operation of the machine thus far described may be best understood by referring to the circuit diagram shown in Fig. 15. Electric current is supplied from a suitable source through main lines 56 and 57. When a weighing is to be made a suitable switch 58 such as a push button is manually closed. If desired this circuit may be closed automatically by a suitable draft rod switch 58ª (Fig. 1). Current now flows from line 56 through the said switch 58, wire 59, magnet 60, resistance 61, and back to line. The energization of magnet 60 actuates switch 62 placing motor M in a circuit 63 across the line. The motor now commences to rotate and will be maintained in operation after the opening of switch 58 by means of a stick circuit which is established from line 57 through resistance 61, magnet 60, wire 66, contacts 65, now closed, wire 64 and back to line 56. Under certain conditions, the contacts 65 may open at the commencement of an operation; but if capacity weights need be applied or removed these contacts will soon close and thereafter the stick circuit will be established and maintained. The operator under these conditions maintains 58 closed until the stick circuit is established by the closure of contacts 65. After the stick circuit is established the motor M will continue to rotate until contacts 65 are opened.

Figure 4:
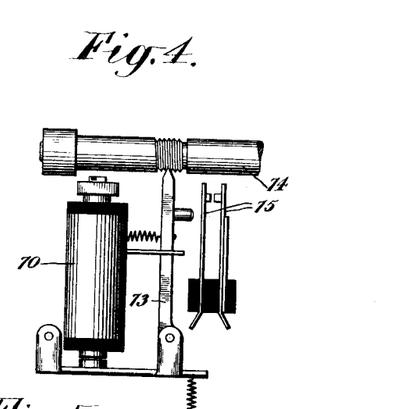
Figs. 4 and 5 are detail views of the mechanically actuated time relays.
Figure 5:
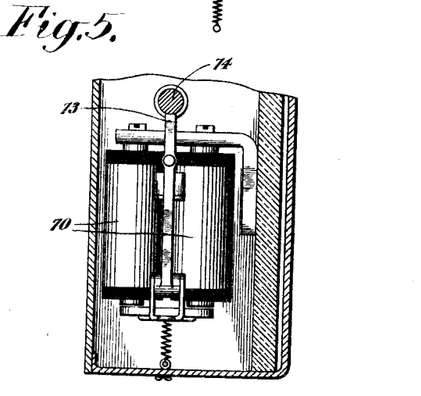
Figure 6:
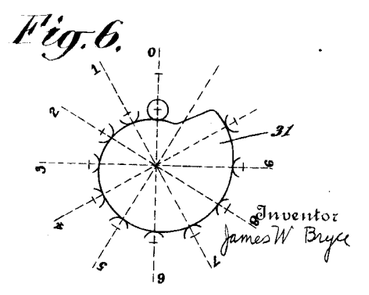
Fig. 6 is a detail view of the weight changing cam.

If a load be of such amount that the contacts 53 be closed signifying that a capacity weight is needed, a circuit will be established through a wire 67, contacts 53 now closed, contacts 68 now closed, wire 69, controlling magnet 70, wires 71 and 72 and back to the other side of resistance 61. I find that it is desirable to prevent excessive voltage across the controlling contacts 53 and by tapping the contact circuit 67—72 across a part of the resistance 61 undesirable voltages at the contacts are prevented. The magnet 70 being energized attracts its armature upwardly and engages a pointed plunger 73 in the threads of a slow rotating shaft 74. This shaft is in geared connection with shaft 47 (see Fig. 2) and is arranged to slowly feed the pointed plunger laterally to the right and after the lapse of an interval of time to cause it to close contacts 75. The detailed arrangement of this type of mechanically delayed relay are shown in Fig. 4 and corresponding reference characters will be employed when it is referred to hereafter, suitable prefixes being employed to distinguish the parts.

The closure of contacts 75 establishes a circuit from line 57, wire 76, clutch magnet 52, contacts 75, wire 78, magnet 70$^b$, wire 79, resistance 80 and back to line 56. The clutch magnet then clutches the motor to the cam 31 which actuates the capacity weight changing device and weights are successively applied until the beam moves away from and opens contacts 53. With these contacts open, magnet 70 will immediately become deenergized allowing plunger 73 to drop away from the screw shaft and permit contacts 75 to open. The clutch magnet will be then deenergized and further application of capacity weights will be stopped.

As an incident to the foregoing operation, magnet 70$^b$ is energized. Plunger 73$^b$ is normally held in engagement with the screw shaft 74 by means of a spring and is withdrawn therefrom upon the energization of magnet 70$^b$. Consequently so long as weights are being changed contacts 65 will be kept closed. After the clutch magnet circuit has become de-energized magnet 70$^b$ will be de-energized, permitting the plunger 73$^b$ to again contact with the screw shaft 74 and after a lapse of time open contacts 65 thereby opening the stick circuit and cutting out the motor.

If sufficient load be partially or entirely removed from the scale so that the beam 20 closes contacts 54, a circuit will be established through 67, contacts 54, contacts 81 now closed, wire 82, magnet 70$^a$ and back to line. The energization of magnet 70$^a$ after a lapse of time closes contacts 75$^a$ and establishes a circuit to clutch magnet 51 whereby weights are successively removed from the beam until the beam moves away from the contacts 54. If this operation is attempted after the motor has stopped its rotation, it will be first necessary to close the push button 58 and reenergize the motor controlling magnet 60.

It may occur that the applied load is greater than the combined offsetting capacity of all of the capacity weights plus the offsetting capacity of the automatic counterbalance. To stop the operation under these conditions, I provide the contacts 68 which are arranged to be opened by the weight carrier 26 when the latter reaches the extreme limit of its travel and has applied all of its weights. The opening of contacts 68 interrupts the circuit 69 to magnet 70 and stops the operation of the machine.

Figure 13:
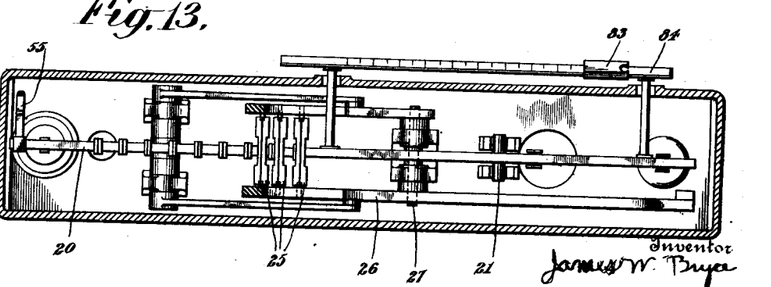
Fig. 13 is a sectional top plan view of the scale beams and associated weight carrier.

It may likewise occur that inadvertently, after a weighing operation is completed, that the tare poise 83 (Fig. 13) may have been left by the operator in displaced position upon the tare beam 84. Under such conditions the beam would be held firmly against the contacts 54 and would maintain these contacts closed even after the load was removed. Under these conditions the motor would tend to continue to run to remove imaginary capacity weights from the beam. To prevent this action I provide limit contacts 81 which are opened by the weight carrier when it is in extreme upper position.

On these scales, it is also desirable to provide a means for rapidly applying all of the weights to the beam, when it is desired to load up the beam and prevent shocks upon the upper mechanism from suddenly applied loads. It is also desirable to provide a means for removing all of the capacity weights for testing the zero of the scale. For this purpose, I provide a two way switch 85 connected to wire 67 which can be thrown to upper position to short circuit contacts 53 when all weights are to be applied. The same switch, when thrown over to its lower pole, short circuits contacts 54 and removes all the weights from the beam.

When the foregoing switch 85 is used the limit contacts 68 and 81 will limit the extreme movement of the weight carrier and open the clutch circuit.

When the slow relay 70ᵇ—73ᵇ, etc., has been so actuated as to open contacts 65, all circuits in the machine will be open so that there will be no current consumption with the machine at rest. This will be understood since when magnet 60 is deenergized there will be no flow of current across resistance 61 and consequently there will be no current flow in the circuits 69 and 82. Magnets 70 and 70ª will then both be deenergized allowing the plungers 73 and 73ª to both drop to lower position opening contacts 75 and 75ª and thereby stopping further flow of current.

Figure 16:
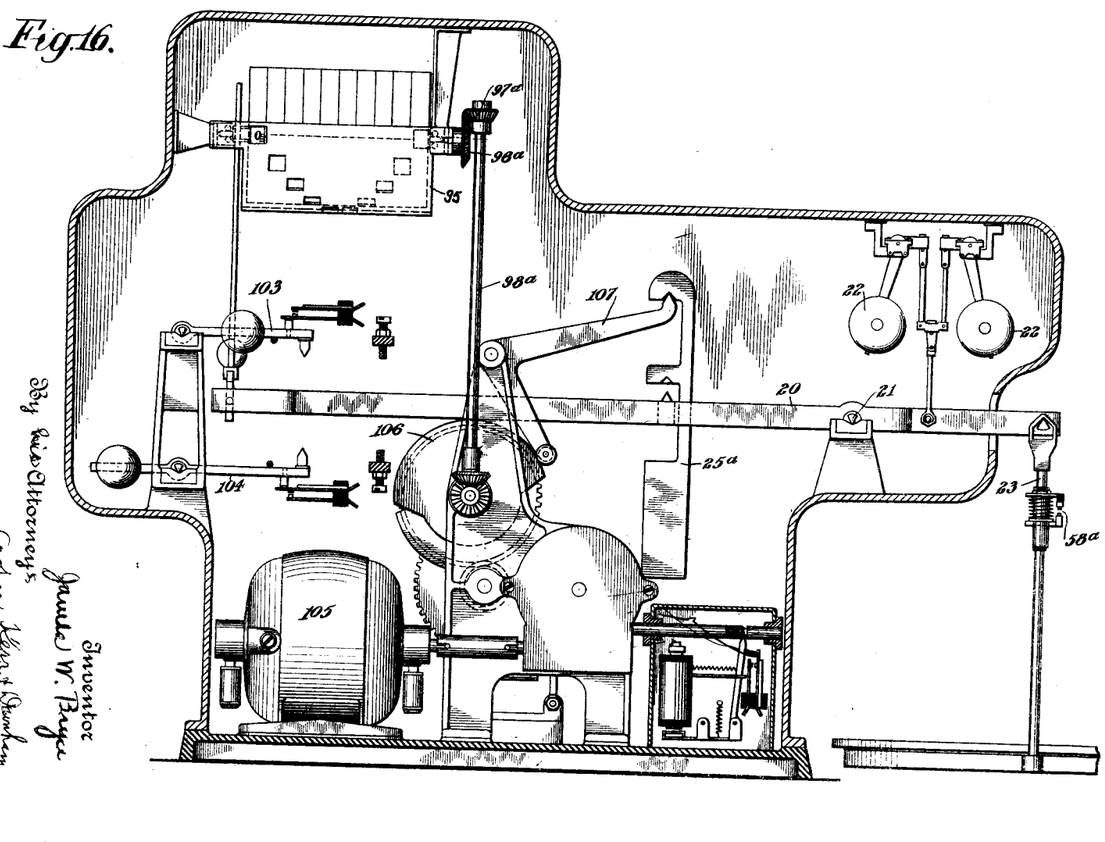
Fig. 16 is a view of a different form of the invention.

While in the present embodiment I have shown a plurality of capacity weights of like value, i. e., each adapted to offset a load of 1000 pounds, it is to be understood that the invention is not limited to such a construction. If desired I may employ what I term factor weights in which case the number of weights to be applied to beam may be materially decreased. For example, weights of 4000, 2000—2000 and 1000 load offsetting value could be employed and factored combinations of these weights could be applied to the beam. A mechanism for automatically applying or removing factored combinations of weights to and from a beam is shown in my copending application, Serial No. 468,836 and I contemplate in the present invention the use of the weight shifting mechanism therein shown and described. The indicator 47 of that application would be omitted and the present shutter 95 substituted therefor. The herein described automatic load counterbalancing mechanism and drum indicator would also be utilized operatively connected to the beam which would be arranged for the proper extent of displacement. Figure 16 shows an embodiment of this mechanism. The pilot weights and contact devices 103—104 control the operation of the motor 105 and control the displacement of the factor cams 106 to thereby control the application of the factor weights 25ª to beam 20. The details of the weight changing operation are fully set forth in my copending application above referred to. In place of driving the shutter by rack 97 and pinion 96 and link 98 connected to the weight carrier, I employ a vertical shaft 98ª and bevel gearing 97ª—96ª. The vertical shaft is driven from the factor cam shaft as in my copending application above referred to. The weight shifter arms 107 and cams 106 are arranged to permit the proper displacement of the beam 20 under the control of the automatic counterbalance. By the provision of the factor cams and weights I am able to materially diminish the number of weights and also obviate the use of the large weight carrier and associated parts.

What I claim is:

1. A weighing scale comprising in combination, beam weighing mechanism for offsetting a portion of the applied load, automatic weighing mechanism for offsetting the remainder of the applied load, a plurality of capacity weights, means called into action by applied loads in excess of predetermined amounts for applying capacity weights to said beam, a chart having successive series of graduations, means for selecting a series of graduations according to the portion of the applied load offset by said beam weighing mechanism, and means controlled by said automatic weighing mechanism for distinctively disclosing a portion of a selected series in accordance with the applied load.

2. A weighing scale comprising in combination, beam weighing mechanism for offsetting a portion of the applied load, automatic weighing mechanism for offsetting the remainder of the applied load, a plurality of capacity weights, means controlled by the applied load for applying one or more capacity weights to said beam and for selecting a series of graduations according to the portion of the applied load offset by said beam weighing mechanism, and means controlled by said automatic weighing mechanism for distinctively disclosing a portion of a selected series in accordance with the applied load.

3. In a weighing scale, in combination, automatic weighing mechanism, a beam, a capacity weight, means called into action by applied loads in excess of a predetermined weight for automatically applying said capacity weight to said beam, a chart having a series of graduations corresponding to weights within the capacity of said automatic mechanism and a series of graduations corresponding to weights to be offset by said capacity weight and said automatic mechanism acting together, and means controlled by said first named means for displaying a proper graduation from the first said series when the capacity weight is off the beam and a proper graduation from the second said series when said capacity weight is on the beam.

4. A weighing scale comprising in combination, a chart having successive series of weight graduations each series having a plurality of graduations designating different weights, means for selectively controlling the visibility of said series, means to increase the capacity of the scale, and means called into action by applied loads in excess of predetermined amounts of the material being weighed for controlling said first named means and to increase the capacity of the scale.

5. A weighing scale comprising in combination, a load support and load-offsetting means therefor, a plurality of weights, means controlled by loads applied to said load support for automatically applying weights to and removing weights from said load-offsetting means, a chart having successive series of graduations, each series having a plurality of separate graduations designating different applied loads, and means controlled by the applied loads for selectively controlling the visibility of said series of graduations.

6. A scale as set forth in claim 5 in which are provided automatic load offsetting mechanism and means controlled thereby for distinctively disclosing a portion of a selected series in accordance with the applied load.

7. A weighing scale comprising in combination with a load support an automatic load counterbalancing means and a movable indicator displaceable by said load support, a part displaced by said load support and adapted to receive capacity weights to increase the load offsetting capacity of the scale, a plurality of successively graduated scale sections upon said indicator, and means for automatically applying capacity weights when the automatic counterbalancing capacity of the scale is exceeded and means controlled by the aforesaid means for automatically changing the display of indication from one section to another as the capacity weights are changed.

8. A weighing scale comprising in combination, a load support and load-offsetting means therefor, a plurality of capacity weights, means controlled by applied loads for applying factored combinations of capacity weights to said load-offsetting means, a chart having successive series of weight-indicating numerals, and means for selectively controlling the visibility of said series.

9. The invention set forth in claim 8 in which are provided automatic load-counterbalancing means and means controlled by that portion of the applied load counterbalanced by said automatic load-counterbalancing means for distinctively disclosing a portion of a selected series.

10. A weighing scale comprising in combination, a load support and load-offsetting means therefor, a plurality of capacity weights, means controlled by applied loads for applying one or more of said capacity weights to said load-offsetting means, a chart having successive series of weight-indicating numerals, each series including a plurality of different numerals designating different applied loads, and means for selectively controlling the visibility of said series.

In testimony whereof I hereto affix my signature.

JAMES W. BRYCE.